United States Patent
Joung et al.

(10) Patent No.: US 10,791,529 B2
(45) Date of Patent: Sep. 29, 2020

(54) METHOD AND DEVICE FOR SYNCHRONIZING SMALL CELL

(71) Applicant: QUCELL NETWORKS CO., LTD., Seongnam-si, Gyeonggi-do (KR)

(72) Inventors: Jin Soup Joung, Seongnam-si (KR); Young Su Chae, Yongin-si (KR); Yong Hoon Lim, Seoul (KR); Hee Jun Lee, Seoul (KR)

(73) Assignee: QUCELL NETWORKS CO., LTD., Seongnam-si (KR)

( * ) Notice: Subject to any disclaimer, the term of this patent is extended or adjusted under 35 U.S.C. 154(b) by 32 days.

(21) Appl. No.: 16/279,918

(22) Filed: Feb. 19, 2019

(65) Prior Publication Data

US 2019/0182783 A1 Jun. 13, 2019

Related U.S. Application Data

(63) Continuation-in-part of application No. PCT/KR2017/009176, filed on Aug. 23, 2017.

(30) Foreign Application Priority Data

| Aug. 31, 2016 | (KR) | 10-2016-0111371 |
| Aug. 31, 2016 | (KR) | 10-2016-0111406 |

(51) Int. Cl.
| *H04W 56/00* | (2009.01) |
| *H04W 84/04* | (2009.01) |
| *H04J 11/00* | (2006.01) |
| *H04L 5/00* | (2006.01) |
| *H04L 5/14* | (2006.01) |

(52) U.S. Cl.
CPC ....... *H04W 56/001* (2013.01); *H04J 11/0073* (2013.01); *H04J 11/0076* (2013.01); *H04L 5/0048* (2013.01); *H04L 5/14* (2013.01); *H04W 84/04* (2013.01); *H04J 11/0079* (2013.01); *H04J 2011/0096* (2013.01)

(58) Field of Classification Search
CPC .................................................. H04W 56/001
USPC ........................................................ 370/350
See application file for complete search history.

(56) References Cited

U.S. PATENT DOCUMENTS

| 8,509,213 B2 | 8/2013 | Sivanesan et al. |
| 9,357,514 B2 | 5/2016 | Zou et al. |
| 9,462,562 B2 | 10/2016 | Chakraborty et al. |

(Continued)

FOREIGN PATENT DOCUMENTS

| KR | 10-2006-0067668 | 6/2006 |
| KR | 10-2012-0137392 | 12/2012 |

(Continued)

OTHER PUBLICATIONS

PCT International Search Report, PCT Application No. PCT/KR2017/009176, dated Nov. 15, 2017, two pages.

*Primary Examiner* — Peter G Solinsky
(74) *Attorney, Agent, or Firm* — Fenwick & West LLP

(57) ABSTRACT

A method of providing a synchronization signal to at least one small cell includes receiving a synchronization reference signal; extracting a synchronization signal from the synchronization reference signal; generating a network listening (NL) synchronization signal based on the synchronization signal; and transmitting the NL synchronization signal for reception by the at least one small cell.

15 Claims, 8 Drawing Sheets

(56) References Cited

U.S. PATENT DOCUMENTS

| | | |
|---|---|---|
| 9,750,044 B2 | 8/2017 | Xu et al. |
| 2011/0211537 A1 | 9/2011 | Sivanesan et al. |
| 2012/0236977 A1 | 9/2012 | Zou et al. |
| 2013/0122917 A1* | 5/2013 | Yavuz ................. H04W 56/001 455/450 |
| 2014/0219255 A1* | 8/2014 | Eyuboglu ............. H04L 1/0036 370/336 |
| 2014/0334399 A1* | 11/2014 | Xu .................... H04W 56/0015 370/329 |
| 2015/0092738 A1 | 5/2015 | Chakraborty et al. |
| 2016/0192304 A1* | 6/2016 | Yi ....................... H04W 56/001 370/311 |
| 2016/0353399 A1* | 12/2016 | Zhao ....................... H04L 69/28 |
| 2019/0124612 A1* | 4/2019 | Ruffini .............. H04W 56/0015 |

FOREIGN PATENT DOCUMENTS

| | | |
|---|---|---|
| KR | 10-2014-0005297 | 1/2014 |
| KR | 10-2016-0006704 | 1/2016 |
| KR | 10-2016-0065153 | 6/2016 |

* cited by examiner

METHOD AND DEVICE FOR SYNCHRONIZING SMALL CELL

CROSS-REFERENCE TO RELATED APPLICATIONS

This application is a continuation-in-part application of, and claims priority under 35 U.S.C. § 365(c) and 35 U.S.C. § 120 from, International Application No. PCT/KR2017/009176, designating the U.S. and filed on Aug. 23, 2017, which claims priority to Republic of Korea Patent Application No. 10-2016-0111371 filed on Aug. 31, 2016 and Republic of Korea Patent Application No. 10-2016-0111406 filed on Aug. 31, 2016, all of which are incorporated herein by reference in their entirety.

BACKGROUND

1. Field

The following description relates to a small cell. The following description also relates to a technology for synchronizing a small cell.

2. Description of Related Art

In recent years, a radio access network (RAN) is undergoing a transformation to make a small cell, such as a micro cell, a pico cell, a femto cell, etc., operate in cooperation with a macro cell having a relatively large coverage area. The small cell is a low power consuming wireless access point and has a relatively small service area. The small cell can function to connect a handheld terminal such as a mobile phone to an IP network in a similar way that a digital subscriber line (DSL) modem connects a computer to the IP network. The small cell was proposed to resolve the problem that as the number of terminals per base station increases, the system efficiency decreases and voice quality degradation and shadowing occur in a cell boundary area and within a building. The small cell is purported to reduce the cell size according to the Cooper's law so that a terminal can be positioned close to the cell to thereby increase a traffic density.

With the use of the small cell, the following advantages may accrue: First, power consumption by the terminal can be reduced. If the terminal is located in close proximity to the base station, signal transmission/reception is made possible with a very little amount of power with the result being that the power consumption efficiency increases. Second, the advantages accrued from using the Multiple-Input and Multiple Output (MIMO) system can be maximized. Most of the total traffic generated are originated from the indoor environment according to the recent mobile traffic usage statistics, and thus small cells are expected to be installed indoors in the future. Since the indoor environment allows for multipath propagation of radio signals at various angles, the advantages of the MIMO system is maximized, which lends itself to an efficient use of the available spectrum. Third, with the use of the small cell, the costs for installation and maintenance can be reduced compared to a conventional base station.

Researches intended to improve the performance of the small cell are being actively conducted at the 3rd Generation Partnership Project (3GPP) and other related research groups. As part of those researches, several schemes for acquiring timing synchronization and frequency synchronization in a small cell have been proposed. One of the schemes is known as the IEEE 1588 synchronization. With the IEEE 1588 synchronization, synchronization is acquired from a synchronization server located in the wireless network. The IEEE 1588 synchronization provides a degree of precision in terms of frequency synchronization that is sufficient for the small cell to be operated. However, the IEEE 1588 synchronization has the drawback that it cannot be used in a small cell, which operates according to the time division duplex (TDD) scheme, because it provides a low level of precision in terms of timing synchronization. Another synchronization scheme known in the art is the Global Positioning System (GPS) synchronization scheme, according to which the small cell receives a GPS signal to acquire timing synchronization and frequency synchronization. Yet another synchronization scheme is known as the Network Listening (NL) synchronization. According to the NL synchronization, the small cell receives a synchronization signal from a macro cell, which already acquired synchronization, to acquire timing synchronization and frequency synchronization. However, since it is typical for the small cell to be operated in the indoor environment, the small cell may occasionally be placed in the situation where it cannot receive a GPS signal or a synchronization signal from the neighboring macro cell. Furthermore, in case of the NL synchronization scheme, a deviation in timing synchronization, which leads to a degradation of the received signal, may occur as a distance between the macro cell and the small cell increases. For this reason, the GPS or NL synchronization scheme is not suitable to be adopted as a reliable synchronization scheme in the small cell.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a method of providing a synchronization signal to at least one small cell includes receiving a synchronization reference signal; extracting a synchronization signal from the synchronization reference signal; generating a network listening (NL) synchronization signal based on the synchronization signal; and transmitting the NL synchronization signal for reception by the at least one small cell.

The receiving a synchronization reference signal may comprise receiving the synchronization reference signal from the Global Navigation Satellite System or a wireless communication network.

The NL synchronization signal may be a Long Term Evolution (LTE) synchronization signal.

The transmitting the NL synchronization signal for reception by the at least one small cell may comprise transmitting the NL synchronization signal using the time division duplex (TDD) or frequency division duplex (FDD) scheme.

The NL synchronization signal may comprise at least one of a network listening-primary synchronization signal (NL-PSS), a network listening-secondary synchronization signal (NL-SSS), a network listening-reference signal (NL-RS), and a network listening-physical broadcast channel (NL-PBCH) signal.

The generating a network listening (NL) synchronization signal based on the synchronization signal may comprise generating the NL synchronization signal using particular resource blocks (RBs), said particular resource blocks being respectively offset by a predetermined frequency offset or a predetermined time period from the resource blocks allocated for a 3rd Generation Partnership Project (3GPP) synchronization signal as defined in the 3GPP specification TS 36.211.

The generating a network listening (NL) synchronization signal based on the synchronization signal may comprise generating the NL synchronization signal using the resource blocks allocated for a 3rd Generation Partnership Project (3GPP) synchronization signal as defined in the 3GPP specification TS 36.211, and the transmitting the NL synchronization signal for reception by the at least one small cell may comprise performing the action of performing frequency conversion of the generated NL synchronization signal by a predetermined frequency offset and modulating the frequency converted NL synchronization signal into an RF signal or the action of transmitting the generated NL synchronization signal at a predetermined time offset after or before the time of receipt of the synchronization reference signal and/or points in time determined thereby.

In another general aspect, an apparatus for providing a synchronization signal to at least one small cell includes a synchronization reference signal reception unit configured to receive a synchronization reference signal; a synchronization signal extraction unit configured to extract a synchronization signal from the synchronization reference signal; an NL synchronization signal generation unit configured to generate a network listening (NL) synchronization signal based on the extracted synchronization signal; and an NL synchronization signal transmission unit configured to transmit the NL synchronization signal for reception by the at least one small cell.

The synchronization reference signal reception unit may be further configured to receive the synchronization reference signal from the Global Navigation Satellite System or a wireless communication network.

The NL synchronization signal may be a Long Term Evolution (LTE) synchronization signal.

The NL synchronization signal transmission unit may be further configured to transmit the NL synchronization signal using the time division duplex (TDD) or frequency division duplex (FDD) scheme.

The NL synchronization signal may comprise at least one of a network listening-primary synchronization signal (NL-PSS), a network listening-secondary synchronization signal (NL-SSS), a network listening-reference signal (NL-RS), and a network listening-physical broadcast channel (NL-PBCH) signal.

The NL synchronization signal generation unit may be further configured to generate the NL synchronization signal using particular resource blocks (RBs), said particular resource blocks being respectively offset by a predetermined frequency offset or a predetermined time period from the resource blocks allocated for a 3GPP synchronization signal as defined in the 3GPP specification TS 36.211.

The NL synchronization signal generation unit may be further configured to generate the NL synchronization signal using the resource blocks allocated for a 3GPP synchronization signal as defined in the 3GPP specification TS 36.211, and the NL synchronization signal transmission unit may be further configured to perform the action of performing frequency conversion of the generated NL synchronization signal by a predetermined frequency offset and modulating the frequency converted NL synchronization signal into an RF signal or the action of transmitting the generated NL synchronization signal at a predetermined time offset after or before the time of receipt of the synchronization reference signal and/or points in time determined thereby.

In another general aspect, an apparatus for providing a synchronization signal to at least one small cell includes a synchronization reference signal reception unit configured to receive a synchronization reference signal; a synchronization signal extraction unit configured to extract a synchronization signal from the synchronization reference signal; an NL synchronization signal generation unit configured to generate a wideband code division multiple access (WCDMA) network listening (NL) synchronization signal based on the synchronization signal; and an NL synchronization signal transmission unit configured to transmit the WCDMA NL synchronization signal through a downlink (DL) channel at a predetermined time offset after or before the time of receipt of the synchronization reference signal and/or points in time determined thereby to enable receipt thereof by the at least one small cell.

The WCDMA NL synchronization signal may comprise at least one of a network listening primary synchronization channel (NL-P-SCH) signal, a network listening secondary synchronization channel (NL-S-SCH) signal, a network listening primary-common pilot channel (NL-PCPICH) signal, and a network listening primary common control physical channel (NL-P-CCPCH) signal.

The predetermined time offset may be set such that a first point in time at which the WCDMA NL synchronization signal is transmitted through the downlink (DL) channel is offset by a time period (T) from a second point in time as defined in the 3GPP specification TS 25.211 as a 3GPP synchronization signal transmission time.

In another general aspect, a method of providing a synchronization signal to at least one small cell includes receiving a synchronization reference signal; extracting a synchronization signal from the synchronization reference signal; generating a wideband code division multiple access (WCDMA) network listening (NL) synchronization signal based on the synchronization signal; and transmitting the WCDMA NL synchronization signal through a downlink (DL) channel at a predetermined time offset after or before the time of receipt of the synchronization reference signal and/or points in time determined thereby to enable receipt thereof by the at least one small cell.

The predetermined time offset may be set such that a first point in time at which the WCDMA NL synchronization signal is transmitted through the downlink (DL) channel is offset by a time period (T) from a second point in time as defined in the 3GPP specification TS 25.211 as a 3GPP synchronization signal transmission time.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
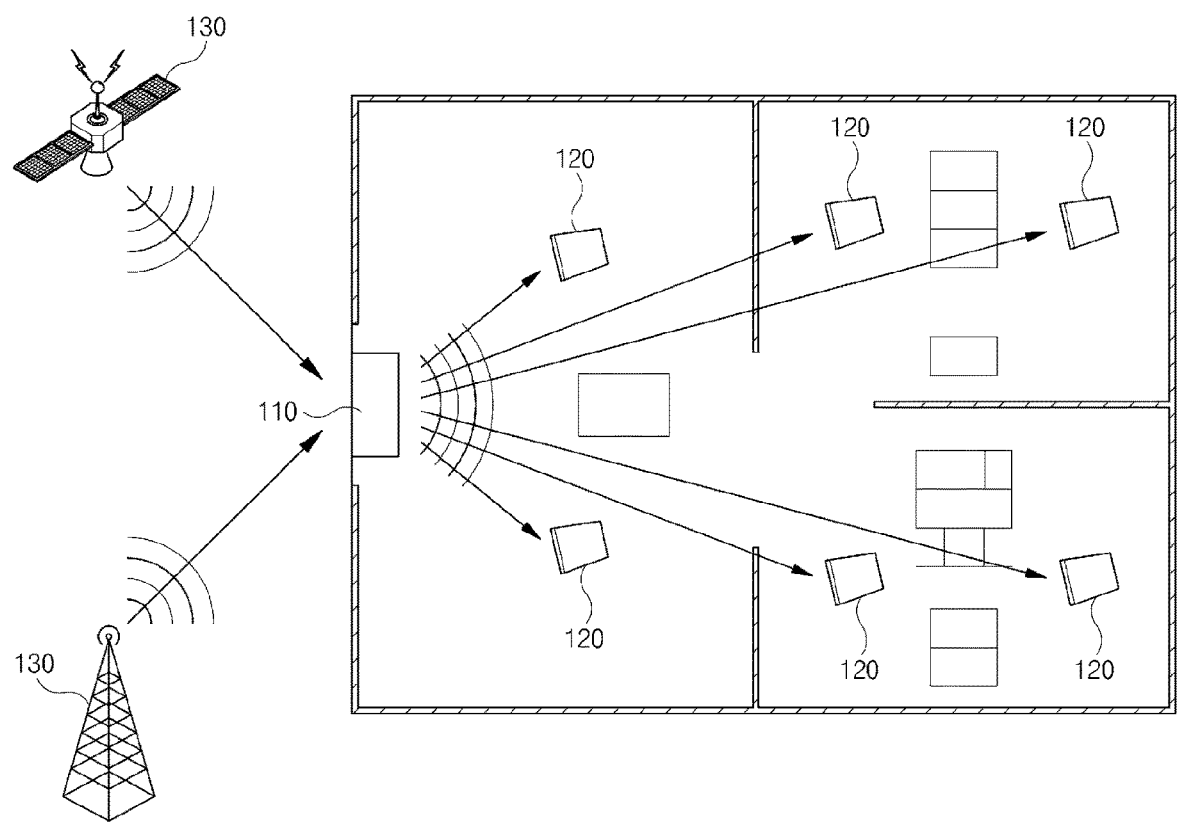
FIG. 1 is a view illustrating an example of an environment in which an apparatus for providing a synchronization signal according to an example of the disclosed technology is installed and used.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

In this disclosure, various examples and implementations are described in further detail to provide a method and apparatus for small cell synchronization. Reference will now be made in detail to embodiments, some examples of which are illustrated in the accompanying drawings. The features and advantages of the disclosed technology will become more apparent by referring to the embodiments of the disclosed technology given in conjunction with the attached drawings. However, the disclosed technology is not limited to the embodiments described below but may be embodied in various different ways. Like reference numerals refer to the like elements throughout.

As used herein, all terminologies, including technical and scientific terms, are to be defined by definitions commonly shared by those skilled in the art to which the invention pertains unless a different definition is provided. Also, general terms and phrases whose definitions are provided in a common dictionary are not to be interpreted out of the common understanding unless another definition is explicitly provided.

Advantages and features of the invention and methods of accomplishing them are to be made apparent by referencing the embodiments which are described in detail in conjunction with the accompanying drawings. However, the present invention is not to be limited to the embodiments set forth herein and may be embodied in different forms. The present embodiments are only provided so that the disclosure of the invention is sufficiently complete so that one of ordinary skill in the art may understand the full scope of the invention, and the present invention is only to be defined by the appended claims.

The terminology used herein is used for the purpose of describing particular embodiments only and is not intended to be limiting the invention. Terms used in the present disclosure include a plural meaning unless clearly stated otherwise in the context. In this application, the terms "comprise" or "include" are intended to designate that a feature, number, step, operation, element, part, or combination thereof as described in the present disclosure includes the presence or addition of one or more other features, numbers, steps, actions, components, parts, or a combination thereof, but do not preclude the addition or presence of other features, numbers, steps, actions, components, parts, or a combination thereof.

Embodiments of the present disclosure are described in further detail below with reference to the appended drawings. However, in the following description, when there is a risk of a description of a known function of configuration unnecessarily obscuring the subject matter of the present invention, such a description of the known function or configuration is omitted.

Examples are directed to providing a small cell synchronization technology that enables small cell synchronization even in an indoor environment where GPS synchronization or NL synchronization is not feasible, and that makes it possible to increase synchronization accuracy compared to a conventional NL synchronization scheme.

While a GPS synchronization function is not necessarily provided in the small cell, NL functions necessary for NL synchronization are provided in almost all small cells. The NL functions for measuring signals from the neighboring small cells or a macro cell are required in the small cell, since the neighboring cells should be monitored for the purpose of management functions such as a handover between the small cells, interference control, etc. in the small cell network. In this disclosure, in consideration of the functional characteristics of the small cell, an inventive apparatus is provided which operates to receive a synchronization reference signal, such as a GPS signal, and provide an NL synchronization signal to a small cell.

FIG. 1 is a view illustrating an example of an environment in which an apparatus for providing a synchronization signal according to an example of the disclosed technology is installed and used.

Referring to the example of FIG. 1, the apparatus 110 according to an example of the disclosed technology may be installed at any indoor or outdoor places that can cover small cells 120 installed indoors. In an example, the apparatus 110 is installed at the indoor or outdoor places where radio signal reception is guaranteed to a certain degree. The apparatus 110 may be configured to receive a synchronization reference signal from a synchronization source 130, extract a synchronization signal from the synchronization reference signal, and generate an NL synchronization signal based on the synchronization signal. In an example, the NL synchronization signal is an NL synchronization signal that complies with the Long Term Evolution (LTE) standard specification, i.e., the 3rd Generation Partnership Project (3GPP) specification TS 36.211. In an example, the NL synchronization signal is an NL synchronization signal that complies with the Wideband Code Division Multiple Access (WCDMA) standard specification, i.e., the 3GPP specification TS 25.211. The apparatus 110 may be configured to transmit the generated NL synchronization signal wirelessly toward the interior where the small cells 120 are operated. The small cells 120 may be configured to receive the NL synchronization signal from the apparatus 110 and perform a process for acquiring timing synchronization and frequency synchronization according to the procedures defined in the 3GPP specification TS 36.211 and/or the 3GPP specification TS 25.211.

Figure 2:
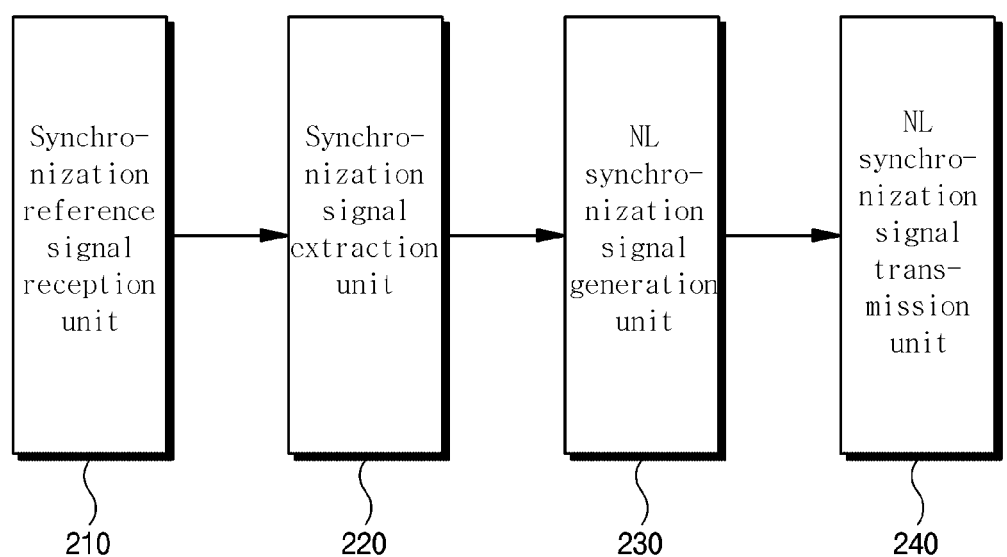
FIG. 2 is a view illustrating an example of a block diagram of the apparatus for providing a synchronization signal according to an example of the disclosed technology.

FIG. 2 is a view illustrating an example of a block diagram of the apparatus for providing a synchronization signal according to an example of the disclosed technology.

Figure 3:
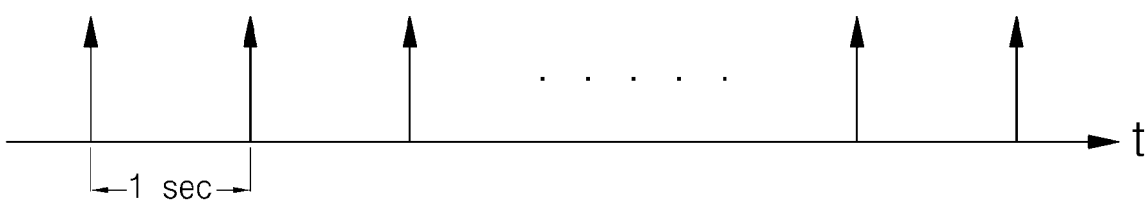
FIG. 3 is a view illustrating an example of a one pulse per second (1PPS) signal.

Referring to the example of FIG. 2, the apparatus 110 includes a synchronization reference signal reception unit 210 configured to receive a synchronization reference signal from the synchronization source 130 and a synchronization signal extraction unit 220 configured to extract a synchronization signal from the received synchronization reference signal. In an example, the synchronization source 130 is a Global Navigation Satellite System (GNSS) as shown in FIG. 1. The GNSS may include one of the Global Positioning System (GPS), the Global Navigation Satellite System (GLONASS), the European Satellite Navigation System (GALILEO), etc. In an example, the synchronization source is a wireless communication network including, for example, a macro base station. The wireless communication network providing a synchronization reference signal may include an LTE network, a WCDMA network, a Global System for Mobile Communications (GSM) network, a Code Division Multiple Access (CDMA) network, a Worldwide Interoperability for Microwave Access (WiMAX) network, and Wireless Broadband (Wibro) network, but is not limited thereto. The synchronization reference signal reception unit 210 may be equipped with an antenna (not shown) adapted to receive a synchronization reference signal, which is a radio signal, from the synchronization source 130. The synchronization signal extraction unit 220 may be configured to extract a synchronization signal from the synchronization reference signal in the manner as known in the art. When the GPS is utilized as the synchronization source 130, the extracted synchronization signal may be a one pulse per second (1PPS) signal as shown in FIG. 3.

The apparatus 110 may further include an NL synchronization signal generation unit 230 configured to generate a network listening (NL) synchronization signal based on the extracted synchronization signal. The NL synchronization signal generation unit 230 may be configured to generate the NL synchronization signal that complies with a mobile communication standard specification, such as the 3GPP specification TS 36.211 and the 3GPP specification TS 25.211, which in turn is complied with by the small cell 120. In an example, the NL synchronization signal is an LTE NL synchronization signal that complies with the 3GPP specification TS 36.211. In an example, the NL synchronization signal is a WCDMA NL synchronization signal that complies with the 3GPP specification TS 25.211.

According to the 3GPP specification TS 36.211, a macro base station is to be designed to transmit a Primary Synchronization Signal (PSS), a Secondary Synchronization Signal (SSS), a Reference Signal (RS), and/or a Physical Broadcast Channel (PBCH) signal, which is information relating to cell management and system operation, to the small cell 120 to have the small cell 120 synchronized. The small cell 120 may be configured to perform synchronization procedures using the PSS, SSS, RS, and the PBCH signal that were received from the macro base station. The small cell 120 may be configured to acquire timing synchronization using the PSS and SSS. The small cell 120 may be configured to acquire timing synchronization and frequency synchronization using the PSS, SSS, and RS. The small cell 120 may be configured to obtain broadcast channel information by further using the PBCH signal.

According to the 3GPP specification TS 25.211, a macro base station is to be designed to transmit a Primary Synchronization Channel (P-SCH) signal, a Secondary Synchronization Channel (S-SCH) signal, a Primary-Common Pilot Channel (PCPICH) signal, and/or a Primary Common Control Physical Channel (P-CCPCH) signal, which is information relating to cell management and system operation, to the small cell 120 to have the small cell 120 synchronized. The small cell 120 may be configured to perform synchronization procedures using the P-SCH, S-SCH, PCPICH, and P-CCPCH signals that were received from the macro base station. The small cell 120 may be configured to acquire timing synchronization using the P-SCH and S-SCH signals. The small cell 120 may be further configured to acquire timing synchronization and frequency synchronization using the P-SCH, S-SCH, and PCPICH signals. The small cell 120 may be further configured to obtain broadcast channel information by further using the P-CCPCH signal.

The LTE NL synchronization signal according to an example of the disclosed technology may be generated by the NL synchronization signal generation unit 230 according to the 3GPP specification TS 36.211 in the same manner that the PSS, SSS, RS, and the PBCH signal are generated in the macro base station. In the descriptions to follow, the PSS, SSS, RS, and the PBCH signal generated by the NL synchronization signal generation unit 230 are referred to as the "Network Listening-Primary Synchronization Signal" (NL-PSS), the "Network Listening-Secondary Synchronization Signal" (NL-SSS), the "Network Listening-Reference Signal" (NL-RS), and the "Network Listening-Physical Broadcast Channel" (NL-PBCH) signal, respectively. In an example, the LTE NL synchronization signal includes the NL-PSS and NL-SSS for providing timing synchronization. In an example, the LTE NL synchronization signal includes the NL-PSS, NL-SSS, and NL-RS for providing timing synchronization and frequency synchronization. In an example, the LTE NL synchronization signal includes the NL-PSS, NL-SSS, NL-RS, and the NL-PBCH signal for providing timing synchronization, frequency synchronization, and broadcast channel information. The NL-PBCH signal may be utilized for various purposes. For example, in order to resolve the problem that the neighboring mobile terminals, upon receiving the LTE NL synchronization signal according to an example of the disclosed technology, may recognize the apparatus 110 as a base station in service, information notifying that the apparatus 110 is not a base station in service, may be carried in the NL-PBCH signal and broadcasted therethrough so that the mobile terminals are prevented from performing unnecessary procedures upon the apparatus 110.

The WCDMA NL synchronization signal according to an example of the disclosed technology may be generated by the NL synchronization signal generation unit 230 according to the 3GPP specification TS 25.211 in the same manner that the P-SCH, S-SCH, PCPICH, and P-CCPCH signals are generated in the macro base station. In the descriptions to follow, the P-SCH, S-SCH, PCPICH, and P-CCPCH signals generated by the NL synchronization signal generation unit 230 are referred to as the "Network Listening Primary Synchronization Channel" (NL-P-SCH) signal, the "Network Listening Secondary Synchronization Channel" (NL-S-SCH) signal, the "Network Listening Primary-Common Pilot Channel" (NL-PCPICH) signal, and the "Network Listening Primary Common Control Physical Channel" (NL-P-CCPCH) signal, respectively. In an example, the WCDMA NL synchronization signal includes the NL-P-SCH and NL-S-SCH signals for providing timing synchronization. In an example, the WCDMA NL synchronization signal includes the NL-P-SCH, NL-S-SCH, and NL-PCPICH signals for providing timing synchronization and frequency synchronization. In an example, the WCDMA NL synchronization signal includes the NL-P-SCH, NL-S-SCH, NL-PCPICH, and NL-P-CCPCH signals for providing timing synchronization, frequency synchronization, and broadcast channel information. The NL-P-CCPCH signal may be utilized for various purposes. For example, in order to resolve the problem that the neighboring mobile terminals, upon receiving the WCDMA NL synchronization signal according to an example of the disclosed technology, may recognize the apparatus 110 as a base station in service, information notifying that the apparatus 110 is not a base station in service, may be carried in the NL-P-CCPCH signal and broadcasted therethrough so that the mobile terminals are prevented from performing unnecessary procedures upon the apparatus 110.

The NL synchronization signal generation unit 230 may be implemented by hardware and/or firmware implementing various radio access technologies (RATs), such as LTE/LTE-A, that enable the apparatus 110 to perform LTE wireless communication with the small cells 120. In an example, the NL synchronization signal generation unit 230 may be implemented so as to comply with a wireless communication interface specification such as LTE-Ue. The NL synchronization signal generation unit 230 may be configured to perform baseband modulation, such as orthogonal frequency division multiplexing (OFDM), upon synchronization data of the format that conforms to a mobile communication specification complied with by the small cell 120 to thereby generate an LTE NL synchronization signal. In an example, the NL synchronization signal generation unit 230 is implemented with a baseband chip incorporating a channel coding function, an OFDM modulation function, etc.

The NL synchronization signal generation unit 230 may be implemented by hardware and/or firmware implementing various radio access technologies (RATs), such as WCDMA, that enable the apparatus 110 to perform WCDMA wireless communication with the small cells 120. In an example, the NL synchronization signal generation unit 230 may be implemented so as to comply with a wireless communication interface specification such as the WCDMA air interface specification. The NL synchronization signal generation unit 230 may be configured to perform baseband modulation, such as code division multiple access (CDMA), upon synchronization data of the format that conforms to a mobile communication specification complied with by the small cell 120 to thereby generate a WCDMA NL synchronization signal. In an example, the NL synchronization signal generation unit 230 is implemented with a baseband chip incorporating a channel coding function, a CDMA modulation function, etc.

Figure 4:
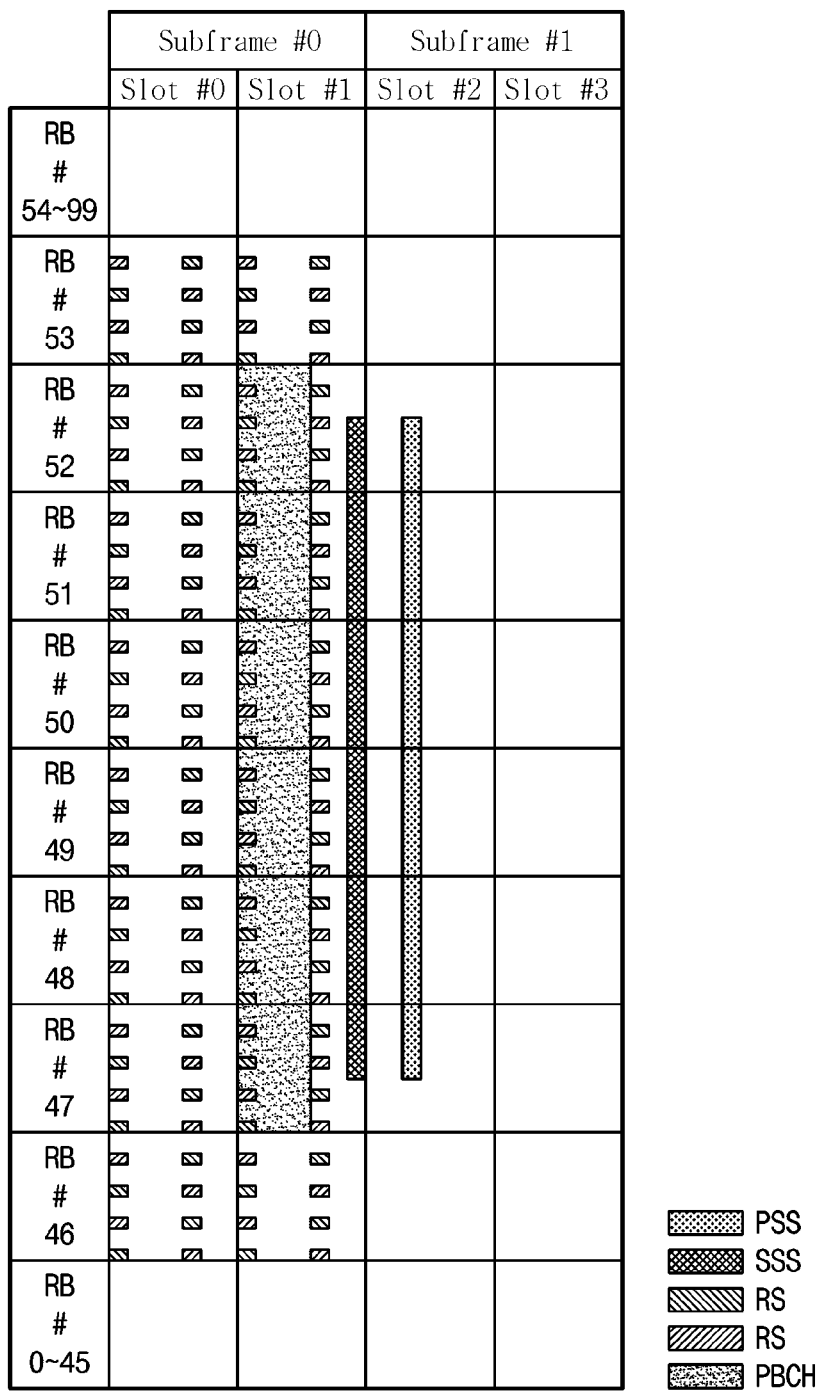
FIG. 4 is a view illustrating an example of a downlink (DL) channel structure in a Long Term Evolution (LTE) system that is compliant with the 3rd Generation Partnership Project (3GPP) specification TS 36.211 and adopts a time division duplex (TDD) scheme.

FIG. 4 is a view illustrating an example of a downlink (DL) channel structure in a Long Term Evolution (LTE) system that is compliant with the 3rd Generation Partnership Project (3GPP) specification TS 36.211 and adopts a time division duplex (TDD) scheme.

As illustrated in the example of FIG. 4, signals relating to synchronization are allocated 6 resource blocks (RBs) among the available resource blocks. According to the illustrated DL channel structure, the DL channel includes a plurality of subframes, one subframe consists of 2 slots, and one slot includes 7 symbols. Thus, one subframe includes 14 symbols. One frame occupies a time interval of 10 ms and includes 10 subframes. Thus, one subframe occupies a time interval of 1 ms. A plurality of resource blocks (RBs) are aligned along the frequency axis. One resource block (RB) includes 12 subcarriers. According to the illustrated DL channel structure, each of the PSS, SSS, RS, and the PBCH signal is carried in the DL channel at one or more slot time intervals with the use of the resource blocks (RBs) allocated to the respective signal. For example, the PSS signal may undergo OFDM modulation with the use of 5 resource blocks (RBs) ranging from the middle of RB #47 to the middle of RB #52, i.e., 60 subcarriers so as to be carried in the DL channel at the 3rd symbol time interval of slot #2.

Turning now to further elaboration of the NL synchronization signal generation unit 230, in an example, the NL synchronization signal generation unit 230 is configured to generate the NL-PSS using the resource blocks (RBs) allocated for the PSS as defined in the 3GPP specification TS 36.211. In such an example, the NL-PSS may act as interference to mobile terminals that are positioned within the coverage of the apparatus 110 and are in direct communication with the macro base station or the small cell 120. In order not to exert interference on the afore-mentioned mobile terminals, in an example, the NL synchronization signal generation unit 230 is configured to generate the NL-PSS using particular resource blocks (RBs) that are respectively offset by a predetermined frequency offset and/or a predetermined time period from the resource blocks (RBs) allocated for the PSS as defined in the 3GPP specification TS 36.211. In an example, the predetermined frequency offset corresponds to 6 resource blocks (RBs) or more, i.e., 72 subcarriers or more, but it needs to be set to meet the condition that the resource blocks (RBs) as offset by the predetermined frequency offset should not be outside of the available bandwidth. In order to implement such frequency offset scheme and/or time offset scheme, the small cell 120 needs to know a frequency offset value and/or a time offset value in advance.

In an example, the NL synchronization signal generation unit 230 is configured to generate the NL-SSS using the resource blocks (RBs) allocated for the SSS as defined in the 3GPP specification TS 36.211. In an example, the NL synchronization signal generation unit 230 is further configured to generate the NL-SSS using particular resource blocks (RBs) that are respectively offset by a predetermined frequency offset and/or a predetermined time period from the resource blocks (RBs) allocated for the SSS as defined in the 3GPP specification TS 36.211. In an example, the NL synchronization signal generation unit 230 is further configured to generate the NL-RS using the resource blocks (RBs) allocated for the RS as defined in the 3GPP specification TS 36.211. In an example, the NL synchronization signal generation unit 230 is further configured to generate the NL-RS using particular resource blocks (RBs) that are respectively offset by a predetermined frequency offset and/or a predetermined time period from the resource blocks (RBs) allocated for the RS as defined in the 3GPP specification TS 36.211. In an example, the NL synchronization signal generation unit 230 is further configured to generate the NL-PBCH signal using the resource blocks (RBs) allocated for the PBCH signal as defined in the 3GPP specification TS 36.211. In an example, the NL synchronization signal generation unit 230 is further configured to generate the NL-PBCH signal using particular resource blocks (RBs) that are respectively offset by a predetermined frequency offset and/or a predetermined time period from the resource blocks (RBs) allocated for the PBCH signal as defined in the 3GPP specification TS 36.211. Similarly, the predetermined frequency offset corresponds to 6 resource blocks (RBs) or more, i.e., 72 subcarriers or more, but it needs to be set to meet the condition that the resource blocks (RBs) as offset by the predetermined frequency offset should not be outside of the available bandwidth. As described above, in order to implement the frequency offset scheme and/or the time offset scheme, the small cell 120 needs to know a frequency offset value and/or a time offset value in advance.

While the example of generating the LTE NL synchronization signals (the NL-PSS, NL-SS, NL-RS, and the NL-PBCH signal) in the NL synchronization signal generation unit 230 by using particular resource blocks (RBs) respectively offset by a predetermined frequency offset and/or a predetermined time period from the resource blocks (RBs) allocated for the 3GPP synchronization signals (the PSS, SSS, RS, and the PBCH signal) as defined in the 3GPP specification TS 36.211 has been explained, the scope of the present disclosure is not limited thereto. In an example, the NL synchronization signal generation unit 230 may generate the LTE NL synchronization signals using the resource blocks (RBs) allocated for the 3GPP synchronization signals (the PSS, SSS, RS, and the PBCH signal) as defined in the 3GPP specification TS 36.211, and an NL synchronization signal transmission unit 240 may change the generated LTE NL synchronization signals by applying a predetermined frequency offset and/or a predetermined time period thereto and modulate the changed LTE NL synchronization signals into RF signals. In such an example, it is possible to modulate the LTE synchronization signals with an RF carrier signal whose frequency was increased or decreased by a predetermined frequency offset instead of applying a predetermined frequency offset to the LTE NL synchronization signals. In an example, the operation of applying a predetermined frequency offset to the LTE NL synchronization signals may accompany the operation of frequency up-conversion or frequency down-conversion of the LTE NL synchronization signals by the predetermined frequency offset.

When the NL-PSS, NL-SSS, NL-RS, and the NL-PBCH signal are carried in the downlink channel with the use of the resource blocks (RBs) with the predetermined frequency offset and/or the predetermined time period being applied, at least part of those resource blocks may overlap with at least part of the resource blocks (RBs) (subcarriers) allocated for user data. Thus, user data transmitted to a mobile terminal in communication with one of the small cells 120 or a macro base station may be affected by interference. However, it should be noted that in case user data transmitted to a particular mobile terminal is impaired, a data recovery process based on a retransmission function can be automatically performed. Thus, the severity of user data impairments may be regarded as being insignificant compared to that of synchronization signal impairments.

Referring back to the example of FIG. 2, the NL synchronization signal generation unit 230 may be configured to generate the WCDMA NL synchronization signals (the NL-P-SCH, NL-S-SCH, NL-PCPICH, and NL-P-CCPCH signals) using the codes allocated for the 3GPP synchronization signals as defined in the 3GPP specification TS 25.211. The NL synchronization signal generation unit 230 may be configured to generate the NL-P-SCH signal using the codes allocated for the P-SCH signal as defined in the 3GPP specification TS 25.211. The NL synchronization signal generation unit 230 may be configured to generate the NL-S-SCH signal using the codes allocated for the S-SCH signal as defined in the 3GPP specification TS 25.211. The NL synchronization signal generation unit 230 may be configured to generate the NL-PCPICH signal using the codes allocated for the PCPICH signal as defined in the 3GPP specification TS 25.211. The NL synchronization signal generation unit 230 may be configured to generate the NL-P-CCPCH signal using the codes allocated for the P-CCPCH signal as defined in the 3GPP specification TS 25.211.

The apparatus 110 may further include an NL synchronization signal transmission unit 240 configured to wirelessly transmit the NL synchronization signal toward the interior where the small cells 120 are installed and operated. The NL synchronization signal transmission unit 240 may include an RF modulator configured to modulate the NL synchronization signal into an RF signal. The NL synchronization signal transmission unit 240 may be further configured to transmit the NL synchronization signal using the time division duplex (TDD) or frequency division duplex (FDD) scheme. The NL synchronization signal transmission unit 240 may include a transmission antenna (not shown) adapted for wireless communication with the small cells 120.

The NL synchronization signal transmission unit 240 may be further configured to transmit the LTE NL synchronization signal through a downlink (DL) channel, which may comprise, e.g., at least one DL subframe, at a predetermined time offset ($t_0$) after or before the time of receipt of the synchronization reference signal and/or points in time determined thereby. In an example, the predetermined time offset ($t_0$) is preset by a network operator. In an example, the predetermined time offset ($t_0$) is a time period defined in the 3GPP specification TS 36.211 or a time period related thereto. In an example, the predetermined time offset ($t_0$) is set such that a first point in time at which the LTE NL synchronization signal is transmitted through the downlink (DL) channel is offset by a time period (T) from a second point in time as defined in the 3GPP specification TS 36.211 as a 3GPP synchronization signal transmission time.

Figure 5:
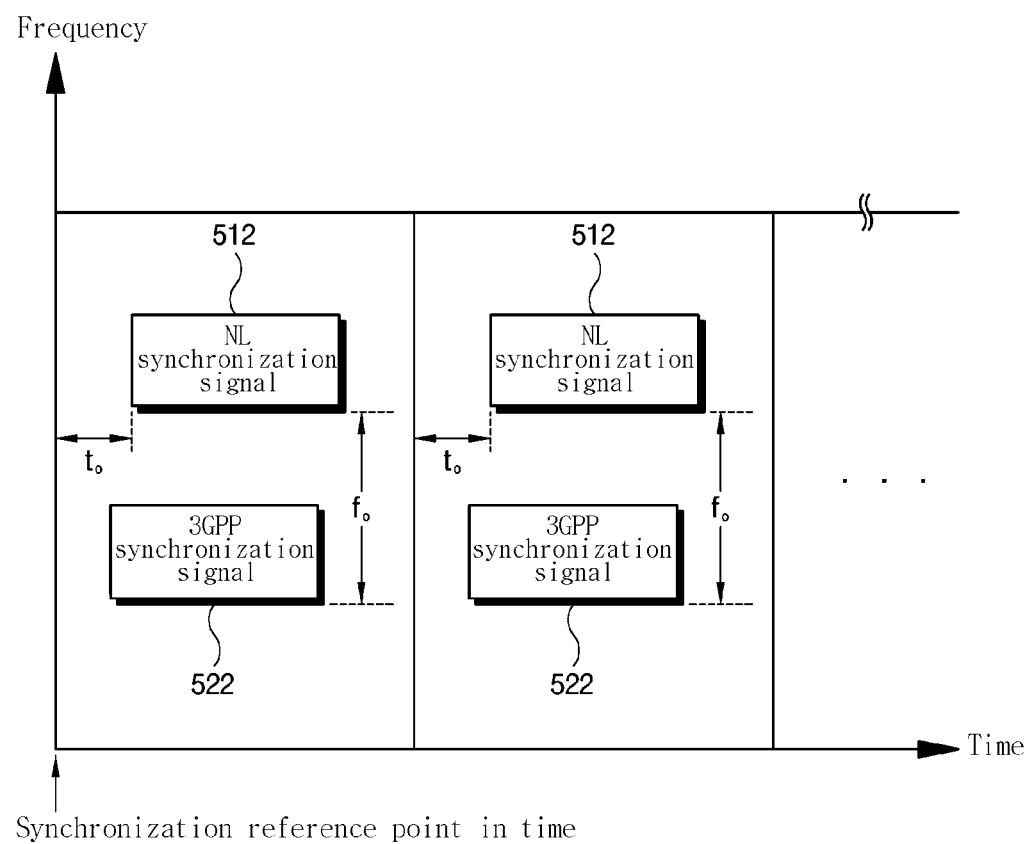
FIG. 5 is a view illustrating an exemplary manner of determining resource blocks (RBs) for an LTE NL synchronization signal from among the resource blocks (RBs) allocated for synchronization signals in the 3rd Generation Partnership Project (3GPP) specification TS 36.211, generating an LTE NL synchronization signal based on the so determined resource blocks (RBs), and transmitting the generated LTE NL synchronization signal through a downlink (DL) channel.

FIG. 5 is a view illustrating an exemplary manner of determining resource blocks (RBs) for an LTE NL synchronization signal from among the resource blocks (RBs) allocated for synchronization signals in the 3rd Generation Partnership Project (3GPP) specification TS 36.211, generating an LTE NL synchronization signal based on the so determined resource blocks (RBs), and transmitting the generated LTE NL synchronization signal through a downlink (DL) channel.

As illustrated in the example of FIG. 5, the LTE NL synchronization signal (the NL-PSS, NL-SSS, NL-RS, and the NL-PBCH signal) 512 may be transmitted repetitively at predetermined points in time in the DL channel. As illustrated, the LTE NL synchronization signal may be carried in the DL channel with the use of particular subcarriers (RBs) that are respectively offset by a predetermined frequency offset ($f_0$) and/or a predetermined time period from the subcarriers (RBs) allocated for a 3GPP synchronization signal 522, i.e., the synchronization signal as defined in the 3GPP specification TS 36.211. As illustrated, the LTE NL synchronization signal may be transmitted through the DL channel at a predetermined time offset ($t_0$) after or before the time of receipt of the synchronization reference signal and/or points in time determined thereby. As described above, the predetermined time offset ($t_0$) is set such that a first point in time at which the LTE NL synchronization signal is transmitted through the DL channel is offset by a time period (T) from a second point in time as defined in the 3GPP specification TS 36.211 as a 3GPP synchronization signal transmission time.

Referring back to the example of FIG. 2, the NL synchronization signal transmission unit 240 may be further configured to transmit the WCDMA NL synchronization signals (the NL-P-SCH, NL-S-SCH, NL-PCPICH, and NL-P-CCPCH signals), which were generated by the NL synchronization signal generation unit 230, through the DL channel, which may comprise, e.g., at least one DL subframe, at a predetermined time offset ($t_0$) after or before the time of receipt of the synchronization reference signal and/or points in time determined thereby. In an example, the predetermined time offset ($t_0$) is set such that a first point in time at which the WCDMA NL synchronization signal is transmitted through the DL channel corresponds to a second point in time as defined in the 3GPP specification TS 25.211 as a 3GPP synchronization signal transmission time. In such an example, the WCDMA NL synchronization signal may act as interference to mobile terminals that are positioned within the coverage of the apparatus 110 and are in direct communication with the macro base station or the small cell 120. In order not to exert interference on the afore-mentioned mobile terminals, in an example, the predetermined time offset ($t_0$) is set such that a first point in time at which the WCDMA NL synchronization signal is transmitted through the DL channel is offset by a time period (T) from a second point in time as defined in the 3GPP specification TS 25.211 as a 3GPP synchronization signal transmission time. In an example, the predetermined time offset ($t_0$) is preset by a network operator. In an example, the predetermined time offset ($t_0$) is a time period defined in the 3GPP specification TS 25.211 or a time period related thereto. In an example, the predetermined time offset ($t_0$) is a time period of from 257 chips to 2,304 chips. In order to implement such time offset scheme, the small cell 120 needs to know a time offset value in advance.

When the predetermined time offset ($t_0$) is set such that a first point in time at which each of the NL-P-SCH, NL-S-SCH, NL-PCPICH, and NL-P-CCPCH signals is transmitted through the DL channel is offset by a time period (T) from a second point in time as defined in the 3GPP specification TS 25.211 as a 3GPP synchronization signal transmission time, at least part of the time intervals during which the NL-P-SCH, NL-S-SCH, NL-PCPICH, and NL-P-CCPCH signals are transmitted may overlap with at least part of the time intervals allocated for user data. Thus, user data transmitted to a mobile terminal in communication with one of the small cells 120 or a macro base station may be affected by interference. However, it should be noted that in case user data transmitted to a particular mobile terminal is impaired, a data recovery process based on a retransmission function can be automatically performed. Thus, the severity of user data impairments may be regarded as being insignificant compared to that of synchronization signal impairments.

Figure 6:
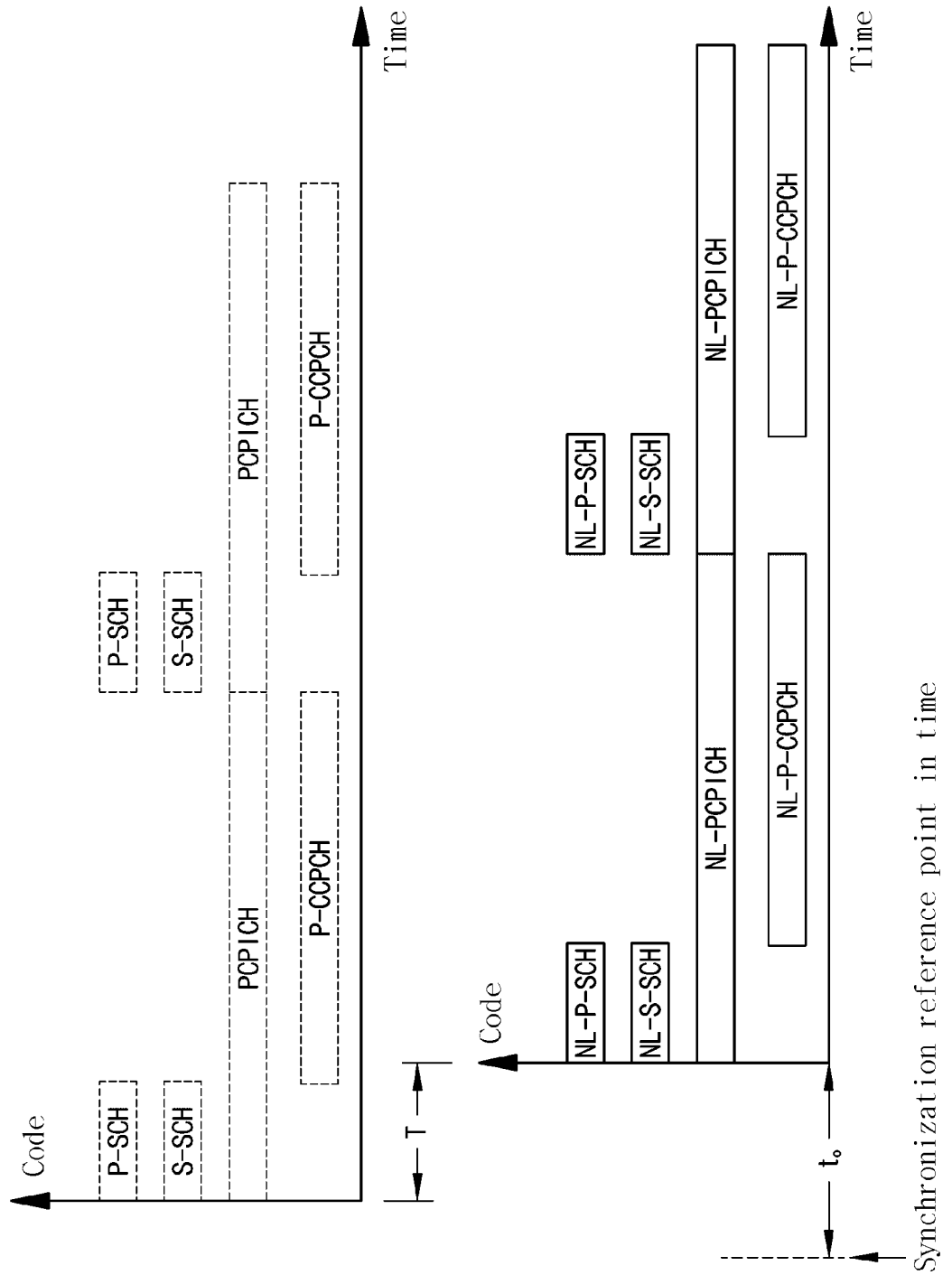
FIG. 6 is a view illustrating an exemplary manner of determining time intervals for a wideband code division multiple access (WCDMA) NL synchronization signal from among the time intervals allocated for synchronization signals in the 3rd Generation Partnership Project (3GPP) specification TS 25.211, and transmitting a WCDMA NL synchronization signal through a downlink (DL) channel based on the so determined time intervals.

FIG. 6 is a view illustrating an exemplary manner of determining time intervals for a wideband code division multiple access (WCDMA) NL synchronization signal from among the time intervals allocated for synchronization signals in the 3rd Generation Partnership Project (3GPP) specification TS 25.211, and transmitting a WCDMA NL synchronization signal through a downlink (DL) channel based on the so determined time intervals.

As illustrated in the example of FIG. 6, the WCDMA NL synchronization signal (the NL-P-SCH, NL-S-SCH, NL-PCPICH, and NL-P-CCPCH signals) 512 may be transmitted repetitively at predetermined points in time in the DL channel. As illustrated, the WCDMA NL synchronization signal may be carried in the DL channel in a particular time interval that is offset by a time period (T) from the time interval allocated for the 3GPP synchronization signal (the P-SCH, S-SCH, PCPICH, and P-CCPCH signals) as defined in the 3GPP specification TS 25.211. As illustrated, the NL-P-SCH signal may be transmitted through the DL channel at a time period (T) after a time at which the P-SCH signal is transmitted. The NL-S-SCH signal may be transmitted through the DL channel at a time period (T) after a time at which the S-SCH signal is transmitted. The NL-PCPICH signal may be transmitted through the DL channel at a time period (T) after a time at which the PCPICH signal is transmitted. Similarly, the NL-P-CCPCH signal may be transmitted through the DL channel at a time period (T) after a time at which the P-CCPCH signal is transmitted. In an example, the time period (T) is set to be 0. In an example, the time period is set to be greater than 0.

While a manner of transmitting the NL synchronization signal through the DL channel in an LTE system adopting the TDD duplexing scheme has been described in the above, it should be appreciated that it is possible to transmit the NL synchronization signal through the DL channel in an LTE system adopting the FDD duplexing scheme in a similar manner. While it has been described in the above that resource blocks (RBs) for use in carrying the NL-PSS, NL-SSS, NL-RS or the NL-PBCH signal in the DL channel may be determined by applying a fixed frequency offset and/or a fixed time period to the resource blocks (RBs) allocated for the respective 3GPP synchronization signal as defined in the 3GPP specification TS 36.211, it should be appreciated that resource blocks (RBs) for use in carrying each of the NL-PSS, NL-SSS, NL-RS and the NL-PBCH signal in the DL channel may be determined with the use of a different frequency offset and/or a different time period. While it has been described that a time interval in which the NL-P-SCH, NL-S-SCH, NL-PCPICH or NL-P-CCPCH signal is transmitted may be determined to be offset by a fixed time period (T) from the time interval allocated for the respective 3GPP synchronization signal as defined in the 3GPP specification TS 25.211, it should be appreciated that a time interval in which each of the NL-P-SCH, NL-S-SCH, NL-PCPICH, and NL-P-CCPCH signals is transmitted may be determined with the use of a different time period.

The synchronization reference signal reception unit 210, the synchronization signal extraction unit 220, the NL synchronization signal generation unit 230, and the NL synchronization signal transmission unit 240 as described above may be implemented into one or more integrated module. In terms of hardware, such integrated module may be implemented using at least one among application specific integrated circuits (ASICs), digital signal processors (DSPs), digital signal processing devices (DSPDs), programmable logic devices (PLDs), field-programmable gate arrays (FPGAs), processors, controllers, micro-controllers and microprocessors. Such integrated module may also be implemented with a firmware/software module that performs at least one function or operation and is executable on the above-described hardware platform. The firmware/software module may be implemented by one or more software applications written in a suitable program language. In this case, such software applications may be stored in a separate system memory module (not shown). The system memory module for storing the software applications may be implemented by one storage medium among a memory card including a flash memory type memory card, a hard disk type memory card, a multimedia card (MMC) type memory, a card type memory (for example, a secure digital (SD) memory card, an extreme digital (XD) memory card, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk, but is not limited thereto.

Figure 7:
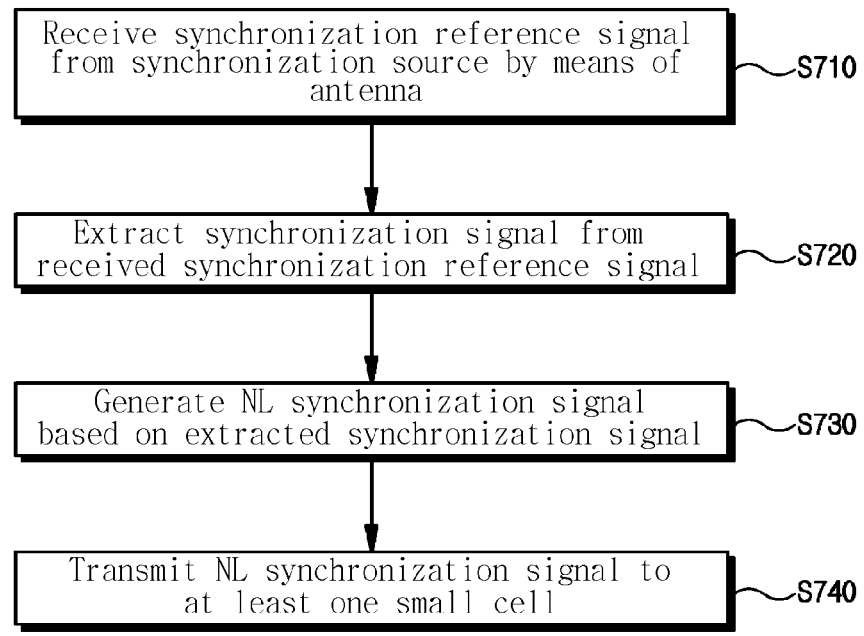
FIG. 7 is a view illustrating an example of a flowchart for explaining a method of providing an LTE NL synchronization signal to a small cell according to an example of the disclosed technology.

FIG. 7 is a view illustrating an example of a flowchart for explaining a method of providing an LTE NL synchronization signal to a small cell according to an example of the disclosed technology.

Referring to the example of FIG. 7, the method of providing an LTE NL synchronization signal to a small cell according to an example of the disclosed technology begins at operation S710 where a synchronization reference signal is received from the synchronization source 130 by means of an antenna. At operation S720, a synchronization signal is extracted from the received synchronization reference signal. As described above, the synchronization signal may be extracted from the received synchronization reference signal using a method known in the art. In an example, the extracted synchronization signal is a one pulse per second (1PPS) signal as illustrated in FIG. 3. At operation S730, an LTE NL synchronization signal is generated based on the extracted synchronization signal. In an example, the NL synchronization signal includes the NL-PSS and NL-SSS. In an example, the NL synchronization signal further includes the NL-RS. In an example, the NL synchronization signal further includes the NL-PBCH. The NL-PSS may be generated using the resource blocks (RBs) allocated for the PSS as defined in the 3GPP specification TS 36.211 or particular resource blocks (RBs) that are respectively offset by a predetermined frequency offset or a predetermined time period from the resource blocks (RBs) allocated for the PSS as defined in the 3GPP specification TS 36.211. The NL-SSS may be generated using the resource blocks (RBs) allocated for the SSS as defined in the 3GPP specification TS 36.211 or particular resource blocks (RBs) that are respectively offset by a predetermined frequency offset or a predetermined time period from the resource blocks (RBs) allocated for the SSS as defined in the 3GPP specification TS 36.211. The NL-RS may be generated using the resource blocks (RBs) allocated for the RS as defined in the 3GPP specification TS 36.211 or particular resource blocks (RBs) that are respectively offset by a predetermined frequency offset or a predetermined time period from the resource blocks (RBs) allocated for the RS as defined in the 3GPP specification TS 36.211. The NL-PBCH may be generated using the resource blocks (RBs) allocated for the PBCH as defined in the 3GPP specification TS 36.211 or particular resource blocks (RBs) that are respectively offset by a predetermined frequency offset or a predetermined time period from the resource blocks (RBs) allocated for the PBCH as defined in the 3GPP specification TS 36.211. At operation S740, at least one LTE NL synchronization signal generated in operation S730 is transmitted to at least one small cell 120. The LTE NL synchronization signal may be modulated into an RF signal for transmission to the small cells 120. In case that the LTE NL synchronization signal was generated with the use of the resource blocks (RBs) allocated for the 3GPP synchronization signal (the PSS, SSS, RS, or the PBCH signal) as defined in the 3GPP specification TS 36.211 at operation S730, the LTE NL synchronization signal may be modulated into an RF signal either by applying a frequency offset to the generated LTE NL synchronization signal and modulating the LTE NL synchronization signal with the frequency offset being applied into the RF signal or by modulating the generated LTE NL synchronization signal using an RF carrier signal whose frequency was increased or decreased by the frequency offset. Also, in case that the LTE NL synchronization signal was generated with the use of the resource blocks (RBs) allocated for the 3GPP synchronization signal (the PSS, SSS, RS, or the PBCH signal) as defined in the 3GPP specification TS 36.211 at operation S730, the generated LTE NL synchronization signal may be transmitted through the DL channel at a predetermined time offset (to) after or before the time of receipt of the synchronization reference signal and/or points in time determined thereby. In an example, the LTE NL synchronization signal may be transmitted using the TDD or FDD scheme.

Figure 8:
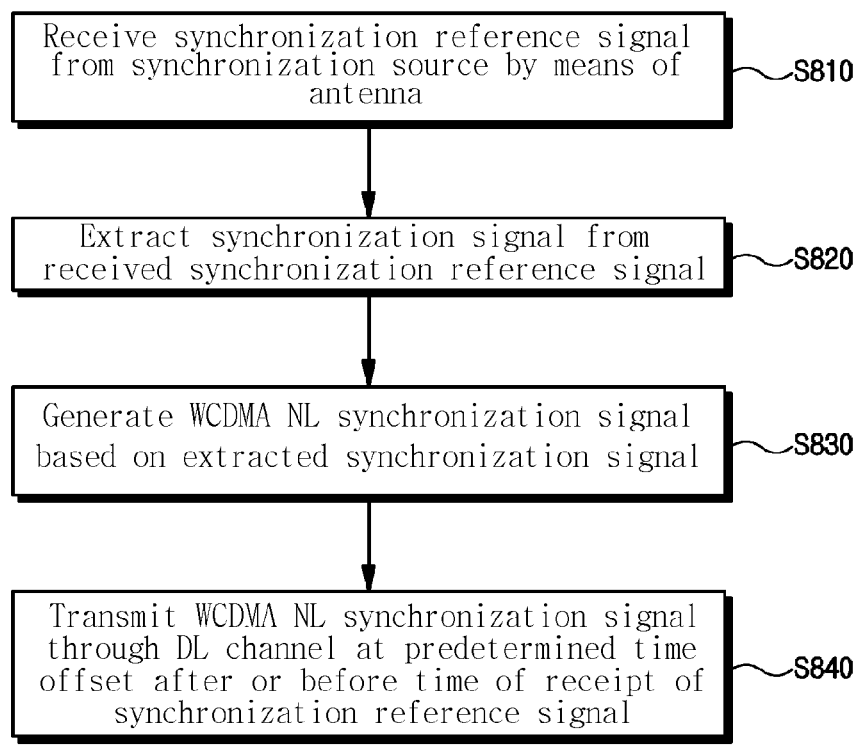
FIG. 8 is a view illustrating an example of a flowchart for explaining a method of providing a WCDMA NL synchronization signal to a small cell according to an example of the disclosed technology.

FIG. 8 is a view illustrating an example of a flowchart for explaining a method of providing a WCDMA NL synchronization signal to a small cell according to an example of the disclosed technology.

Referring to the example of FIG. 8, the method of providing a WCDMA NL synchronization signal to a small cell according to an example of the disclosed technology begins at operation S810 where a synchronization reference signal is received from the synchronization source 130 by means of an antenna. At operation S820, a synchronization signal is extracted from the received synchronization reference signal. As described above, the synchronization signal may be extracted from the received synchronization reference signal using a method known in the art. In an example, the extracted synchronization signal is a one pulse per second (1PPS) signal as illustrated in FIG. 3. At operation S830, a WCDMA NL synchronization signal is generated based on the extracted synchronization signal. In an example, the WCDMA NL synchronization signal includes the NL-P-SCH and NL-S-SCH signals. In an example, the WCDMA NL synchronization signal further includes the NL-PCPICH signal. In an example, the WCDMA NL synchronization signal further includes the NL-P-CCPCH signal. The WCDMA NL synchronization signal may be generated using the codes allocated for the corresponding 3GPP synchronization signal as defined in the 3GPP specification TS 25.211. The NL-P-SCH signal may be generated using the codes allocated for the P-SCH signal as defined in the 3GPP specification TS 25.211. The NL-S-SCH signal may be generated using the codes allocated for the S-SCH signal as defined in the 3GPP specification TS 25.211. The NL-PCPICH signal may be generated using the codes allocated for the PCPICH signal as defined in the 3GPP specification TS 25.211. The NL-P-CCPCH signal may be generated using the codes allocated for the P-CCPCH signal as defined in the 3GPP specification TS 25.211.

At operation S840, the WCDMA NL synchronization signal generated in operation S830 is transmitted through the DL channel to at least one small cell 120 at a predetermined time offset ($t_o$) after or before the time of receipt of the synchronization reference signal and/or points in time determined thereby. The NL-P-SCH signal may be modulated into an RF signal for transmission through the DL channel at the time interval allocated for the P-SCH signal as defined in the 3GPP specification TS 25.211 or at a particular time interval that is offset by a time period (T) therefrom. The NL-S-SCH signal may be modulated into an RF signal for transmission through the DL channel at the time interval allocated for the S-SCH signal as defined in the 3GPP specification TS 25.211 or at a particular time interval that is offset by a time period (T) therefrom. The NL-PCPICH signal may be modulated into an RF signal for transmission through the DL channel at the time interval allocated for the PCPICH signal as defined in the 3GPP specification TS 25.211 or at a particular time interval that is offset by a time period (T) therefrom. The NL-P-CCPCH signal may be modulated into an RF signal for transmission through the DL channel at the time interval allocated for the P-CCPCH signal as defined in the 3GPP specification TS 25.211 or at a particular time interval that is offset by a time period (T) therefrom.

According to examples of the disclosed technology, a small cell can be synchronized in an interior environment where GPS or NL synchronization is not feasible, and a degree of accuracy in small cell synchronization can be increased compared to a conventional NL synchronization method.

In the examples disclosed herein, the arrangement of the illustrated components may vary depending on an environment or requirements to be implemented. For example, some of the components may be omitted or several components may be integrated and carried out together. In addition, the arrangement order of some of the components and the like may be changed.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of providing a synchronization signal to at least one small cell, comprising:
   receiving a synchronization reference signal;
   extracting a synchronization signal from the synchronization reference signal;
   generating a network listening (NL) synchronization signal based on the synchronization signal; and
   transmitting the NL synchronization signal for reception by the at least one small cell,
   wherein the generating the network listening (NL) synchronization signal based on the synchronization signal comprises generating the NL synchronization signal using particular resource blocks (RBs), said particular resource blocks being respectively offset by a predetermined frequency offset or a predetermined time period from the resource blocks allocated for a 3rd Generation Partnership Project (3GPP) synchronization signal as defined in the 3GPP specification TS 36.211.

2. The method of claim 1, wherein the receiving a synchronization reference signal comprises receiving the synchronization reference signal from the Global Navigation Satellite System or a wireless communication network.

3. The method of claim 2, wherein the NL synchronization signal is a Long Term Evolution (LTE) synchronization signal.

4. The method of claim 3, wherein the transmitting the NL synchronization signal for reception by the at least one small cell comprises transmitting the NL synchronization signal using the time division duplex (TDD) or frequency division duplex (FDD) scheme.

5. The method of claim 4, wherein the NL synchronization signal comprises at least one of a network listening primary synchronization signal (NL-PSS), a network listening secondary synchronization signal (NL-SSS), a network listening—reference signal (NL-RS), and a network listening—physical broadcast channel (NL-PBCH) signal.

6. A method of providing a synchronization signal to at least one small cell, comprising:
receiving a synchronization reference signal;
extracting a synchronization signal from the synchronization reference signal;
generating a network listening (NL) synchronization signal based on the synchronization signal; and
transmitting the NL synchronization signal for reception by the at least one small cell,
wherein the generating the network listening (NL) synchronization signal based on the synchronization signal comprises generating the NL synchronization signal using the resource blocks allocated for a 3rd Generation Partnership Project (3GPP) synchronization signal as defined in the 3GPP specification TS 36.211, and wherein the transmitting the NL synchronization signal for reception by the at least one small cell comprises performing the action of performing frequency conversion of the generated NL synchronization signal by a predetermined frequency offset and modulating the frequency converted NL synchronization signal into an RF signal or the action of transmitting the generated NL synchronization signal at a predetermined time offset after or before the time of receipt of the synchronization reference signal and/or points in time determined thereby.

7. An apparatus for providing a synchronization signal to at least one small cell, comprising:
a synchronization reference signal reception unit configured to receive a synchronization reference signal;
a synchronization signal extraction unit configured to extract a synchronization signal from the synchronization reference signal;
an NL synchronization signal generation unit configured to generate a network listening (NL) synchronization signal based on the extracted synchronization signal; and
an NL synchronization signal transmission unit configured to transmit the NL synchronization signal for reception by the at least one small cell,
wherein the NL synchronization signal generation unit is further configured to generate the NL synchronization signal using particular resource blocks (RBs), said particular resource blocks being respectively offset by a predetermined frequency offset or a predetermined time period from the resource blocks allocated for a 3GPP synchronization signal as defined in the 3GPP specification TS 36.211.

8. The apparatus of claim 7, wherein the synchronization reference signal reception unit is further configured to receive the synchronization reference signal from the Global Navigation Satellite System or a wireless communication network.

9. The apparatus of claim 8, wherein the NL synchronization signal is a Long Term Evolution (LTE) synchronization signal.

10. The apparatus of claim 9, wherein the NL synchronization signal transmission unit is further configured to transmit the NL synchronization signal using the time division duplex (TDD) or frequency division duplex (FDD) scheme.

11. The apparatus of claim 10, wherein the NL synchronization signal comprises at least one of a network listening—primary synchronization signal (NL-PSS), a network listening—secondary synchronization signal (NL-SSS), a network listening—reference signal (NL-RS), and a network listening—physical broadcast channel (NL-PBCH) signal.

12. An apparatus for providing a synchronization signal to at least one small cell, comprising:
a synchronization reference signal reception unit configured to receive a synchronization reference signal;
a synchronization signal extraction unit configured to extract a synchronization signal from the synchronization reference signal;
an NL synchronization signal generation unit configured to generate a network listening (NL) synchronization signal based on the extracted synchronization signal; and
an NL synchronization signal transmission unit configured to transmit the NL synchronization signal for reception by the at least one small cell,
wherein the NL synchronization signal generation unit is further configured to generate the NL synchronization signal using the resource blocks allocated for a 3GPP synchronization signal as defined in the 3GPP specification TS 36.211, and wherein the NL synchronization signal transmission unit is further configured to perform the action of performing frequency conversion of the generated NL synchronization signal by a predetermined frequency offset and modulating the frequency converted NL synchronization signal into an RF signal or the action of transmitting the generated NL synchronization signal at a predetermined time offset after or before the time of receipt of the synchronization reference signal and/or points in time determined thereby.

13. An apparatus for providing a synchronization signal to at least one small cell, comprising:
a synchronization reference signal reception unit configured to receive a synchronization reference signal;
a synchronization signal extraction unit configured to extract a synchronization signal from the synchronization reference signal;
an NL synchronization signal generation unit configured to generate a wideband code division multiple access (WCDMA) network listening (NL) synchronization signal based on the synchronization signal; and
an NL synchronization signal transmission unit configured to transmit the WCDMA NL synchronization signal through a downlink (DL) channel at a predetermined time offset after or before the time of receipt of the synchronization reference signal and/or points in time determined thereby to enable receipt thereof by the at least one small cell, wherein the predetermined time offset is set such that a first point in time at which the WCDMA NL synchronization signal is transmitted through the downlink (DL) channel is offset by a time period (T) from a second point in time as defined in the 3GPP specification TS 25.211 as a 3GPP synchronization signal transmission time.

14. The apparatus of claim 13, wherein the WCDMA NL synchronization signal comprises at least one of a network listening primary synchronization channel (NL-P-SCH) signal, a network listening secondary synchronization channel (NL-S-SCH) signal, a network listening primary-common pilot channel (NL-PCPICH) signal, and a network listening primary common control physical channel (NL-P-CCPCH) signal.

15. A method of providing a synchronization signal to at least one small cell, comprising:

receiving a synchronization reference signal;

extracting a synchronization signal from the synchronization reference signal;

generating a wideband code division multiple access (WCDMA) network listening (NL) synchronization signal based on the synchronization signal; and transmitting the WCDMA NL synchronization signal through a downlink (DL) channel at a predetermined time offset after or before the time of receipt of the synchronization reference signal and/or points in time determined thereby to enable receipt thereof by the at least one small cell, wherein the predetermined time offset is set such that a first point in time at which the WCDMA NL synchronization signal is transmitted through the downlink (DL) channel is offset by a time period (T) from a second point in time as defined in the 3GPP specification TS 25.211 as a 3GPP synchronization signal transmission time.

\* \* \* \* \*